United States Patent [19]

Costa et al.

[11] Patent Number: 5,274,789
[45] Date of Patent: Dec. 28, 1993

[54] MULTIPROCESSOR SYSTEM HAVING DISTRIBUTED SHARED RESOURCES AND DYNAMIC AND SELECTIVE GLOBAL DATA REPLICATION

[75] Inventors: Maria Costa, Buccinasco; Carlo Leonardi, Legnano, both of Italy

[73] Assignee: Bull HN Information Systems Italia S.p.A., Caluso, Italy

[21] Appl. No.: 660,486

[22] Filed: Feb. 25, 1991

[30] Foreign Application Priority Data

Mar. 19, 1990 [EP] European Pat. Off. ........ 90830107.1

[51] Int. Cl.[5] ............................................. G06F 12/00
[52] U.S. Cl. ............................. 395/425; 364/DIG. 1;
364/243; 364/246; 364/243.1; 364/255.1;
364/255.7
[58] Field of Search ................ 395/400, 425, 600, 800

[56] References Cited

U.S. PATENT DOCUMENTS

| | | | |
|---|---|---|---|
| 4,928,224 | 5/1990 | Zulian | 395/325 |
| 4,951,193 | 8/1990 | Muramatsu et al. | 395/800 |
| 5,055,999 | 10/1991 | Frank et al. | 395/800 |

FOREIGN PATENT DOCUMENTS 0320607 6/1989 European Pat. Off. .

OTHER PUBLICATIONS

Kessler et al., "An Analysis of Distributed Shared Memory Algorithms", The 9th International Conf. on Distributed Computing Systems, Jun. 9, 1989.
Swan, R. J. et al., "The Implementation of the Cm* Multi-Microprocessor", Proc. of the National Computer Conference, Dallas, Jun. 13-16, 1977.
Scheurich, C. et al. "Dynamic Page Migration in Multiprocessors with Distributed Global Memory", IEEE Trans. on Comp. V38 1N.8 p. 1154.
Fleisch, Brett D. "Distributed Shared Memory in a Loosely Coupled Distributed System", Compcon Spring 88, pp. 182-184.

*Primary Examiner*—Rebecca L. Rudolph
*Attorney, Agent, or Firm*—J. H. Phillips; J. S. Solakian

[57] ABSTRACT

Multiprocessor system having distributed shared resources and dynamical and selective global data replication in which a plurality of processors communicate each with the other through a sytem bus. Each CPU is provided with a local memory storing data used locally and global data shareable by a plurality of processes operative in differing CPUs and therefore replicated in the local memory of each CPU. The global data replication is performed, at page level, only when a global data page is effectively needed by a plurality of processes operative in differing CPUs and in those CPUs where the page is needed, the replication in the other CPUs being performed in a predetermined trash page of the local memory so that memory space required for replication is minimized, as is traffic on the system bus for global data replication and global data writes required for assuring global data consistency.

4 Claims, 6 Drawing Sheets

| RA | GS | S0 | S1 | S2 | S3 |
|----|----|----|----|----|----|
| 1  | 1  | 0  | 1  | 1  | 1  |
| 2  | 1  | 1  | 1  | 1  | 0  |
| 3  | 1  | 1  | 1  | 0  | 0  |
| 4  | 0  | 0  | 0  | 1  | 0  |
| 5  | 0  | 1  | 0  | 0  | 0  |

FIG. 6

| RA | GS | S0 | S1 | S2 | S3 |
|----|----|----|----|----|----|
| 1  | 1  | 0  | 1  | 1  | 1  |
| 2  | 1  | 0  | 1  | 1  | 0  |
| 3  | 0  | 0  | 1  | 0  | 0  |
| 4  | 0  | 0  | 0  | 1  | 0  |
| 5  | 0  | 1  | 0  | 0  | 0  |

FIG. 7

| RA | GS | S0 | S1 | S2 | S3 |
|----|----|----|----|----|----|
| 1  | 1  | 0  | 0  | 1  | 1  |
| 2  | 0  | 0  | 0  | 1  | 0  |
| 3  | 0  | 0  | 1  | 0  | 0  |
| 4  | 0  | 0  | 0  | 1  | 0  |
| 5  | 0  | 1  | 0  | 0  | 0  |

FIG. 8

| RA | GS | S0 | S1 | S2 | S3 |
|----|----|----|----|----|----|
| 1  | 0  | 0  | 0  | 0  | 1  |
| 2  | 0  | 0  | 0  | 1  | 0  |
| 3  | 0  | 0  | 1  | 0  | 0  |
| 4  | 0  | 0  | 0  | 1  | 0  |
| 5  | 0  | 1  | 0  | 0  | 0  |

MULTIPROCESSOR SYSTEM HAVING DISTRIBUTED SHARED RESOURCES AND DYNAMIC AND SELECTIVE GLOBAL DATA REPLICATION

BACKGROUND OF THE INVENTION

1. Field of Use

The present invention relates to a multiprocessor system having distributed shared resources and dynamic and selective global data replication. It also refers to the related method for dynamic and selective allocation of global data.

2. Prior Art

Modern data processing systems may perform several processes at the same time and are referred to as multiprocessing systems.

While a program may be defined as a sequence of ordered instructions which perform on a set of data, a process may be briefly defined as "an address space, a thread of control which operates within that address space and the set of required system resources". The execution of a program requires the creation of one or more processes, that is the set up, in terms of addressable space and organization of the required resources and their operation.

The data needed for program execution and on which the program operates must also be loaded in the process space and a physical working memory space must necessarily correspond to the process space as a material support for the data.

In a multiprogramming system (or even simply in a multiprocessing system) the joint generation of a plurality of processes is implied. It may then happen that some of the data used in differing processes is of various times, the same for one or more processes. Such data is defined as "shared data".

The problem is therefore to avoid the repeated loading of the same data, when that data is used either simultaneously or subsequently in multiple processes, in an address space, and hence in a physical memory space, which differs for each process, and the need to replicate the same information for each process or to move it from one space to another, depending on the process.

To avoid this problem, the prior art has developed the concept of shared memory, such as is typical, for example, of the UNIX (Registered Trademark) operating system to store data which is used by two or more processes. The processes which operate on the shared data get the shared data from this shared memory.

In modern data processing systems and in order to obtain higher performance, a plurality of processors are used jointly, wherein each processor may jointly and simultaneously execute a plurality of processes. The processors are interconnected by a system bus, through which they communicate among themselves and with common shared resources, such as input/output units and working memories.

In such systems, local memories are used to overcome the performance limitations imposed by the system bus and to reduce the competition in the access to the system bus. A local memory is related to a processor and may be accessed by the related processor without need to obtain access to the system bus. Such local memories are preferably used to store "local data", that is, data used only by the related processor in the processes executed by the related processor.

As far as "shared data" is concerned, however, the multiprocessor architecture poses a problem in that it is clear that several processors may operate with a plurality of processes on the same shared data. Therefore, the concept has been introduced in multiprocessor systems of local data, shared or unshared, as data used in the processes performed in a single processor, and global data, that is, shared data which is used by processes executed in differing processors. The global data may be stored in a single shared memory, which may be accessed through the system bus, or in one or more local memories to which the unrelated processor may have access through the system bus, with the already indicated drawbacks.

To overcome, at least in part, this drawback, the concept of replicated global data has been recently proposed and described in European Patent Office Patent application EP-A-0320607, published Jun. 21, 1989 (U.S. Pat. No. 4,928,224).

According to this concept, global data is stored and replicated in each of the local memories of a multiprocessor system. In this way, each system processor may read the global data in its related local memory without having access to the system bus.

In the event of a write operation to be performed on global data, access to the system bus is required to write the data in all local memories, thus assuring its consistency everywhere. This drawback is largely balanced, however, by the resulting advantages.

A second drawback is that the local memories must be sized to store the global data. Each of them must therefore have a large capacity, adequate for storing all the global data which may be required for parallel execution of several processes. To keep the capacity of the local memories in economically acceptable limits, it is therefore necessary to keep the global data and related replication at a minimum.

With this aim, the Italian patent application N. 22593A/89 filed on Dec. 4, 1989 (U.S. Pat. No. 5,182,808) discloses the concept of dynamic managing of global data.

Global data, particularly that required in user processes (as opposed to global data used by the supervisor operating system) may be effectively used by many processors only in particular circumstances and only temporarily. For most of the time, and even if potentially shareable by many processes in a plurality of processors, the global data is used in only one processor.

Therefore the data is treated as local data and replicated and treated as global data only when many processors use the data.

The conversion from local data to global data, and vice versa, is performed dynamically at run time. In this way, and as long as the data is qualified as local, it is not necessary to allocate memory space in each and all of the local memories, nor for replication operations, so that system bus access operations are not required to provide consistency among the copies of the data.

It is desirable, with the aim of a more efficient use of the local memories, to further limit the replication of global data, performing it according to selective criteria and only in the local memories of the processors actually requiring the data.

This approach would require the development of complex and sophisticated replication mechanisms, which should permit control of write operations in selected local memories and verification that such operations have been performed.

It would therefore be necessary to develop interprocessor communication systems and procedures which would allow each processor to know if certain data is used by other processors, and by which of them, with such drawbacks that the practical embodiment would offer no advantage over the prior art.

OBJECT OF THE INVENTION

It is the object of the preseent invention to achieve local and global data in a multiprocessor system with dynamic and selective global data replication in a very simple way which, rather than introducing complications in the interprocessor communication mechanisms, simplifies interprocessor communications.

SUMMARY OF THE INVENTION

According to the present invention, the global data, as long as it is used by one processor only, is stored only in the local memory related to the one processor using that data and is qualified as local data.

The data is qualified as global data only when at least a second processor requires use of the data. On this occurrence a command is issued for the replication of the data in all local memories.

In the processors which actually do not need to use the data, the replication is performed in a predetermined and limited physical memory space, defined as a "trash page" so that no memory space is used for the data except for that of the trash page.

In this way, and even if the replication operation is undifferentiated and affects all processors, it can be controlled in a simple and feasible way. The allocation of the global data is performed in selective way and is controlled not by the processor which requests the replication, but by the processors which must execute it and which decide, in autonomous way, where to perform it.

If a processor needs global data which has been previously discarded, a further replication will be requested, and this time being performed in the usable space of the local memory. Likewise, if a processor does not need the data any more, the local memory space may be freed for other use by moving the data into the trash page. In such instances, the global data will again become local data when is required for use by only one processor, rather than by several. Thereafter, the operations involving the data are performed only locally.

These advantages are achieved in a substantially conventional system architecture with the use of two distinct, address translation units in each of the system processors, a local memory in each of the processors, the local memory having a storage area characterized as trash page, which may be real or virtual and which is specifically devoted to store discarded information, a set of predetermined tables which describe in each of the local memories, the status of the local memory pages, and by means of particular changes to the hardware/software page fault mechanism (that is of the procedures which manage a page fault signal) and disconnect procedures which provide exit from a system process.

The dynamic and selective global data replication in local memories of the system requires that the same global datum has to be univocally referenced at system level and that its physical allocation has to be managed in independent way in each of the processors. To this purpose a global datum is referenced at system level by a single address, conventionally defined as "real", to distinguish it from the physical address. The real address is converted into a physical address, locally and autonomously in each processor, by an address translation unit coupled to each local memory.

Given that the multiprocessor system of the present invention, as well as those described in the cited patent applications, make use of the virtual memory concept, the result is that each system processor is provided with a first memory management unit, or MMU, which converts logical or virtual addresses, used at software level, directly into physical addresses in the case of local data, and into real addresses in the case of global data. The real addresses are then locally converted into physical address by a second translation unit.

With this approach, and in the case of replication of the same global datum, this datum may be locally stored in different physical memory spaces and selectively stored in the trash page.

BRIEF DESCRIPTION OF THE DRAWINGS

After these introductory considerations, the features and the advantages of the invention will result more cleraly from the following description of a preferred form of embodiment and from the enclosed drawings where.

DESCRIPTION OF A PREFERRED EMBODIMENT

Figure 1:
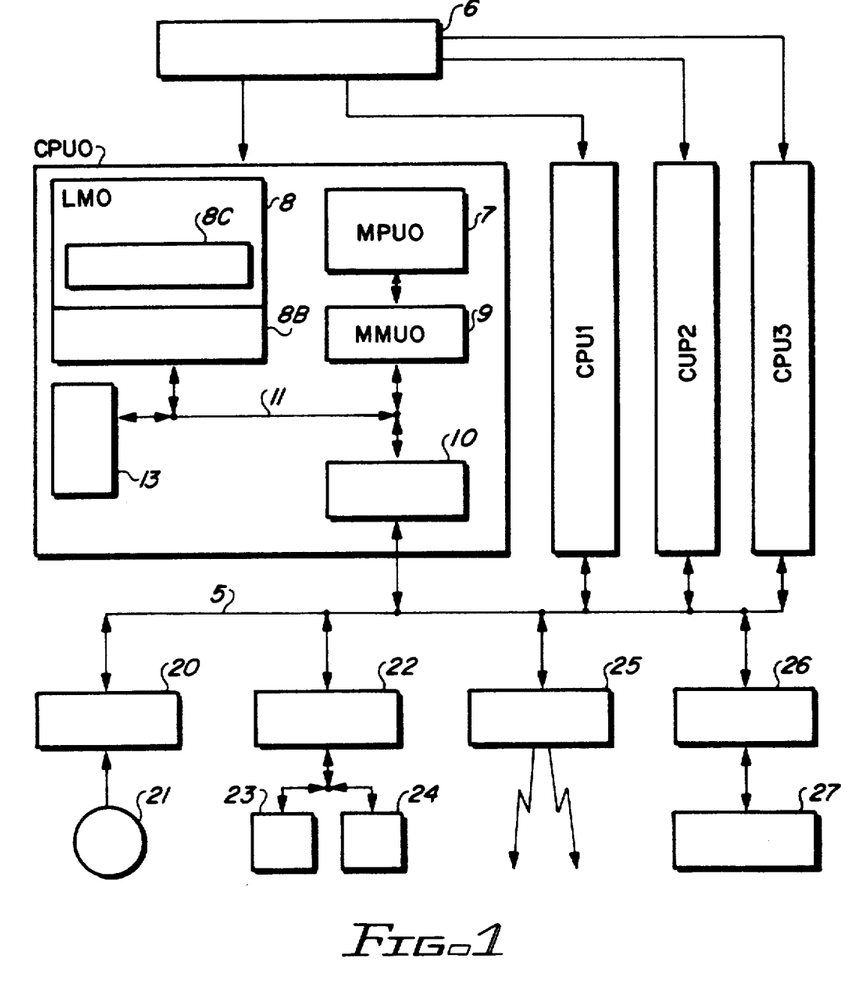
FIG. 1 is a block diagram of a multiprocessor system having shared resources and providing a dynamic and selective replication and management of global data, in accordance with the present invention.

FIG. 1 shows a block diagram of a multiprocessor system capable of global data replication and dynamic and selective management in accordance with the present invention. A multiprocessor system similar to the one shown in FIG. 1 is described in detail in EP-A-320607 (U.S. Pat. No. 4,928,224) as well as in EP-A-0369264 and 0369265 (EPO applications N. 89120432.3 filed Nov. 4, 1989, N. 891204333.1 filed Nov. 4, 1989) (U.S. Pat. Nos. 5,182,808 and 5,214,776, respectively) and in EP-A-0387644 (EPO Application N. 90104155.8 filed Mar. 3, 1990) (U.S. Pat. No. 5,247,629), to which reference is made for all information not provided herein.

The system of FIG. 1 comprises four central processing units CPU 0, CPU 1, CPU 2, CPU 3, connected each to the other through a system bus 5. The operation of the CPUs are timed by a timing unit 6. Considering CPU 0, whose structure and operation are representative of the other CPUs in the system, CPU 0, for example, comprises a microprocessor 7, or MPU 0, an address managing unit 9, or MMU 0, a local memory 8, or LM 0, an interface and arbitration unit 10, a local arbitrator 13 and an address translation unit 8B. Microprocessor 7 communicates with the local memory 8 and with the interface unit 10 by means of a local bus 11.

Microprocessor 7 has access to the system bus, through interface unit 10, for receiving from and forwarding information to the other CPUs, and for referencing the local memories of the other CPUs and peripheral control units connected to the system bus, such as a controller 20 for disk unit 21 or secondary memories, a controller 22 for a display 23 and keyboard 24, a communication line controller 25, or a controller 26 for a printer 27.

Arbitration unit 10, together with corresponding arbitration units in the other CPUs, arbitrate access to the system bus by the CPUs and manages the communication protocol on the system bus. The other CPUs of the system may obtain access to the local bus 11 for CPU 0, through the interface unit 10, and from there to the local memory 8.

Address management unit 9, is shown in FIG. 1 as an entity separate from processor 7, but may be incorporated as an integral part of processor 7. For instance this is the case if processor 7 is an integrated microprocessor manufactured by the US firm MOTOROLA and marketed with the code MC68030.

In addition to address management unit 9 (MMU), CPU 0 includes an address translation unit 8B, which is coupled to local memory 8.

Local memory includes a physical page 8C, which is referred to as trash page and which is referenced by a predetermined physical page address, which is preferably the same for all the processors (for instance the address 0).

The addressing of local memory 8 is performed by physical addresses received through the local bus 11, either from address management unit 9 or from interface and arbitration unit 10. In the event a real address is put on the local bus (hence a global data address) this address is detected as a global data address and is converted into a physical address by translation unit 8B, which is coupled to the local memory 8.

Translation unit 8B is initialized at system switching start-up, to convert the received real addresses into addresses of the trash page, with the exception of certain predetermined real addresses which are used to reference "kernel" global data, for which a 1 to 1 translation is provided (that is the real address is identical to the physical one). Subsequently, and in a way which will be considered on the following, the contents of the translation unit 8B are changed so as to convert some of the real addresses to addresses of physical pages other than the trash page.

Figure 2:
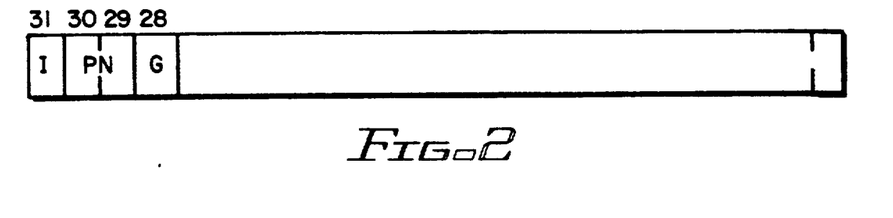
FIG. 2 shows the format of the addresses generated by the memory management units (MMU) in the system of FIG. 1.

In the system of FIG. 1, the addresses output from the MMUs of the CPUs, have the format shown in FIG. 2. Such addresses are intentionally not referenced as physical addresses because they may either be effective physical addresses, or real addresses, which require a further conversion to physical addresses.

A physical or real address, may be output from the MMU of any one of the CPUs comprises 32 bits (bits 0–31).

The more significant bits, respectively referenced as I (Internal Space, bit 31), PN (for Processor Number, bit 29, 30) and G (for Global, bit 28) define the nature of the space addressed by bits 0–27. Bit 31, depending on its level true or false, conceptually distinguishes between two spaces, an internal space (bit 31-1) and an external space (bit 31 = 0). Within the external space (bit 31 = 0), bits 29, 30 identify, depending on their level, the memory space (that is the local memory) of one of the several CPUs 0, 1, 2, 3.

Within the local memory space, bit 28 asserted indicates that the referenced space is a "global space" for storing global data; bit 28 deasserted indicates that the referenced space is a local space for storing local information.

Bit 31 asserted indicates that the addressed space is internal that is within the resources of the same CPU where the address is generated. If bits 29, 30 are both deasserted and bit 31 is asserted the selected internal space is the one of the local memory and within this space bit 28, depending on its level, references a local or global space.

If at least one of bits 29, 30 is asserted, the referenced internal space is generically a "register space": bits 0–28 or some of them are used to reference one among a plurality of resources other than the local memory.

Bit 28, in addition to identifying a global space (bit 28 = 1) as opposed to a local space (bit 28 = 0) has another important function: when asserted it indicates that the address to which it pertains is a "real address" and must be converted in a physical address for referencing the local memories. The conversion operation is peformed autonomously by each CPU, through its related translation unit (such as unit 8B in CPU 0).

Bits from 27 to 12 of each address are a physical or real page address (depending on bit 28 being false or true) and bits from 11 to 0, are an "offset" (invariant in the conversion of an address from logical to real and from real to physical) which references a byte of information within a 4 kbytes page.

It is clear that by means of this address format a CPU may reference, through the related MMU, either an entry of its own local memory (internal space) or an entry of any one of the other local memories (external space) which are seen as distributed and shared memory resources.

The selection of an internal memory space may be performed through the local bus, without affecting the system bus.

The selection of an external space is performed through the local bus and the interface unit of the agent CPU, the system bus, the interface unit and the local bus of the CPU related to the destination local memory.

The previously mentioned patent applications, in particular EP-A-0320607 and EP-A-0369265, describe in detail the circuits which perform these operations.

Figure 3:
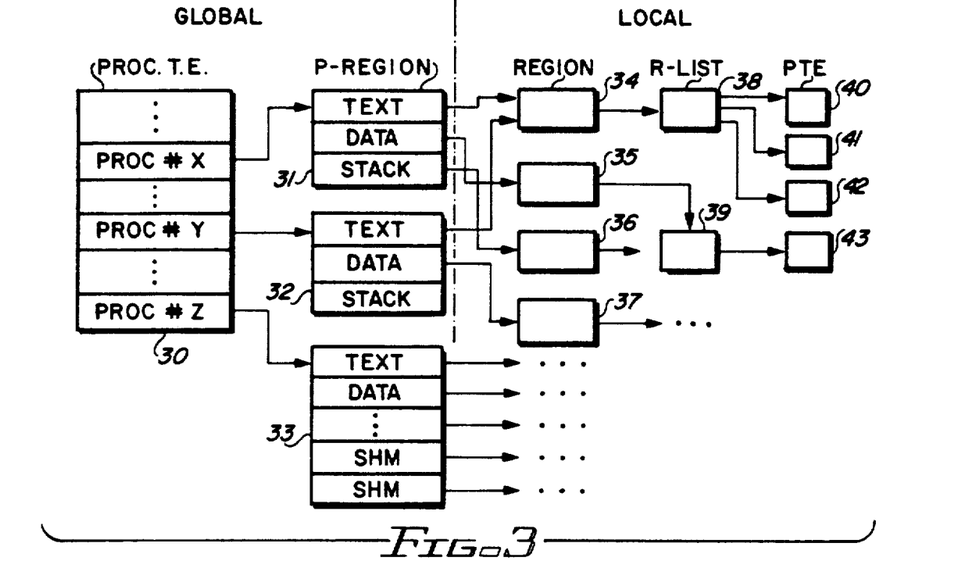
FIG. 3 shows the memory tables which are used by a memory management system of conventional kind in the system of FIG. 1.

In the case of a global data write, the operation is performed jointly in all the local memories. The global data addressing, both for read and write operations, is performed with the real address, which is converted locally into a physical address by the address translation unit coupled to each local memory just upstream of each local memory. The management of the local memories, which together comprise a distributed and shared memory, is performed, as known, by means of a main memory management program or MMMS, which is based on a set of software tables linked in a hierarchical data structure. FIG. 3 shows such tables and their linking in schematics.

These tables are stored in memory and, in view of the specific context of the invention, it is indicated for each whether it is local (LOCAL) data, or global (GLOBAL) data, that is replicated in each of the local memories. The memory space needed for storing such tables is allocated by the supervisor system, at system initialization, in a predetermined physical space, other than the trash page.

The first table 30 named PROC.T.E is basically a list of processes (in FIG. 3 the generical processes PROC#X, PROC#Y, and PROC#Z are shown) which have been created for execution in the system by means of system primitives which in the case of UNIX V are FORK and EXEC.

Each process is referenced by an identifier (Process ID) and has a pointer to a data region named P-REGION. The P-REGION contains information related to the virtual address space used by the process (space bases), that is to the regions of addresses used by the process.

In FIG. 3, P-REGIONs 31, 32, 33 are shown respectively connected to processes #X, #Y, #Z. A first region, named TEXT, is for storing instructions executed by the process. A second region, named DATA is for storing data used and/or created by the process. A third region, named STACK is for storing transient information used in the course of process execution. A fourth or more regions (if present), named SHM (shared memory) is/are for storing global data. For each one of these regions or segments there is a data structure in the table P-REGION. This data structure defines the virtual address base of the segment and a pointer to a further table named REGION.

FIG. 3 shows REGION tables 34, 35, 36, 37. Table PROC.T.E. and P-REGION contain information which may be used and tested by more processes in differing processors. This information is a global data and therefore these tables are replicated in each one of the local memories in a shared memory segment of the "Kernel". This segment is allocated in a predetermined memory space whose physical address coincide with the real address.

The REGION table related to each virtual segment of the process contains information as to the size and nature of the segment and a pointer to a second table or list named R-LIST (tables 38, 39 of FIG. 3). The R.-LIST defines, in terms of "displacement", the virtual addresses of the page sets which form the segment. Each address refers to a further table PTE (page table entry, tables 40, 41, 42, 43 of FIG. 3). This table contains the physical page address which correspond to each logical address and which is assigned by the MMMS. Other information stored therein includes, for example the location of the data referenced by the physical/logical address on a disk or swap file as well as the status of the related memory page (valid if data are effectively stored in memory or invalid.

Tables REGION, R-LIST and PTE contain information specific to the process which they describe and therefore are themselves local data, stored only in the local memory of the processor where the process is active. As it will be described in the following, the table REGION related to a shared memory segment furhter contains a pointer to a global data structure which the system uses to coordinate the use of the shared memory segment in the CPUs.

This data structure is an essential feature of the present invention.

The conventional operation of an operating system with the above described data structures related to non-shared segments is as follows.

When a new process is created in a processor by a FORK system call, the operating system adds, in the table PROC.T.E., a new process identifier and related pointer, builds up a new P-REGION for the new process, a new REGION and a new R-LIST for each segment of the process and a new PTE table, where the physical pages are tagged as missing (invalid).

The effective allocation of physical pages to the process, the compilation of the PTE tables with physical page addresses and their validation, are performed, page by page, on demand.

The operating system further loads the possible references to a mass storage disk and to a context register, into the MMU related to the processor. All the MMU entries are tagged as invalid, but, in fact, the previous operations have reserved a memory space, but without filling it with valid contents.

At this point the process may be started. The processor, where the MMU has been so preset, controls the reading of a first instruction of the TEXT segment at a first virtual address, and this address is received by the MMU. Since there is an invalid contents flag corresponding to this entry, the MMU generates an error signal (Page fault) which calls for supervisor intervention.

The supervisor may ascertain the reason for the error signal by means of the context register contents and the already mentioned linked tables.

It therefore reads the first text page from secondary storage and loads it into an available physical page of local memory, whose physical address is related to the virtual address of the first text page. The PTE entry corresponding to the virtual page address is loaded with the corresponding physical page address and with a valid page indicator.

The process may then be restarted and proceeds until the generation of a virtual address for which there is no corresponding valid physical address. This causes a retriggering of the "page fault handling" mechanism.

It must be noted that the above described operations are performed at local processor level, without affecting the system bus, except for read operations from secondary storage and the global data table write operations.

The above described operations occurr in the handling of text, data and stack segments.

In the case of the shared memory segment SHM, the system operates in a new and innovative way, according to the present invention.

Figure 4:
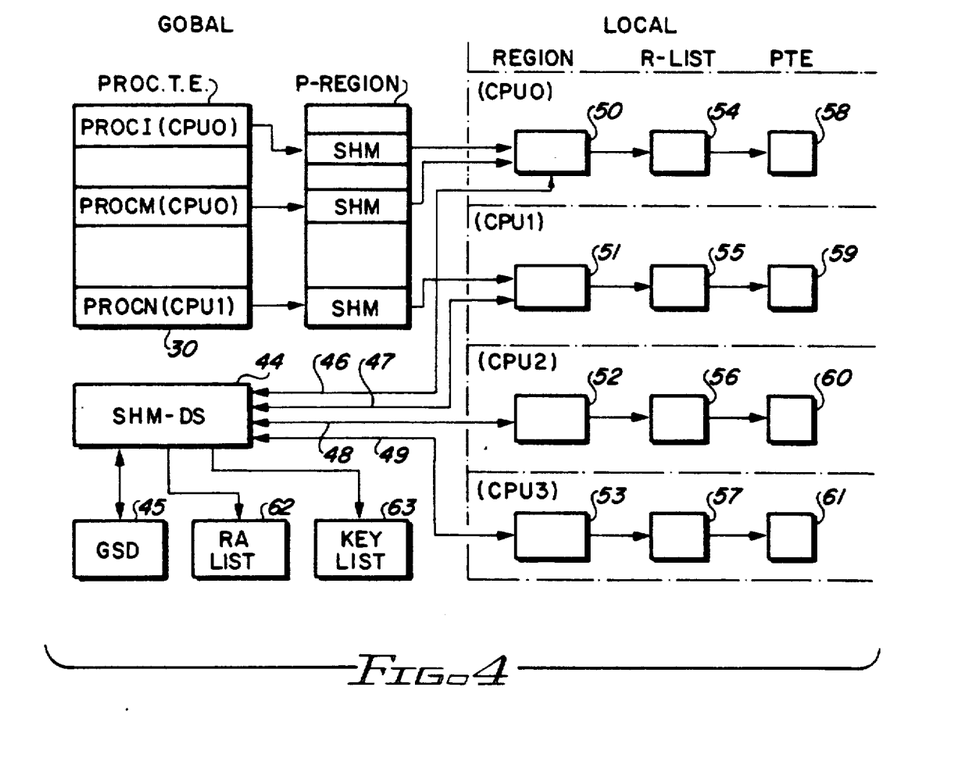
FIG. 4 shows the memory tables which are used according to the present invention for the dynamic and selective replication and management of global data, and the data segments to which they pertain.

FIG. 4 shows in diagrammatic representation the tables used, in accordance with the invention, for managing shared memory segments, and the links of such tables. In this case a plurality of processes listed in table PROC.T.E (in FIG. 4 processes PROC#I, PROC#M, PROC#N are shown) may share the same memory segment SHM. To manage this segment the system uses a new global table comprising a fixed size portion 44 SHM-DS (for Shared Memory-Data Structure) and a variable size portion GSD (for Global Segment Descriptor).

In the SHM-DS table, information is stored which is related to the features of the memory segment intended for storing shared data. The following information is specifically mentioned:

A) N pointers (46, 47, 48, 49) as many as the CPUs in the system (4 in the described embodiment). Each pointer references a local table REGION 50, 51, 52, 53, each table being specific to a CPU. Each REGION table points to a local R-LIST 54 . . . 57.

B) Information related to the user who has created the shared segment, the user group to which the user pertains, segment access permissions (who and in which manner has access to the segment), number of users actively using the segment, segment size.

C) A code "key-t" which identifies the function of the segment, for example, the data which is to be stored in the segment.

Each of the local REGIONs contains the information already considered with reference to the TEXT, DATA, STACK segments.

In addition, it contains information as to the number of users which are using the region.

The local R-LISTs, related to the SHM segment, are functionally identical to those related to the TEXT, DATA, STACK segments.

Figure 5:
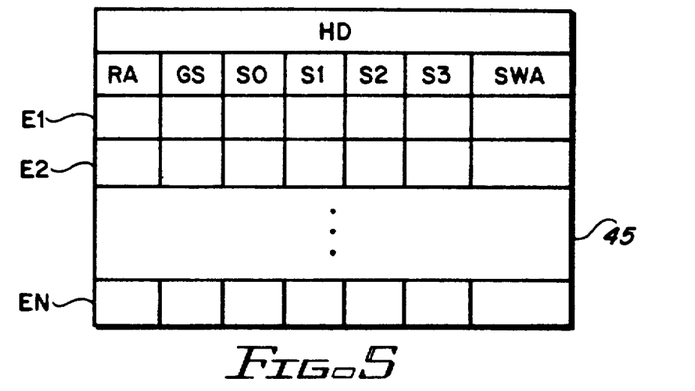
FIG. 5 shows the structure of one of the tables of FIG. 4 which describes the features of a global data segment.

The format of the global segment descriptor GSD 45 is shown in FIG. 5 and comprises an identification header HD and one entry E1, E2, . . EN for each logical page address of the segment.

Each entry contains a page real address RA corresponding to a page logical address, a status bit GS, which defines the related page as global or local, a status bit for each CPU, S0, S1, S2, S3 which defines for each CPU if the page is valid or invalid and a swap area address SWA, where the information contained in the related page is to be saved in the case of a swap. Tables GSD points through tables SHM-DS, REGION, R-LIST, as shown in FIG. 4, to four local tables PTE 58, 59, 60, 61. Each one of tables 58, 59, 60, 61 is for storing a physical page address corresponding to each virtual page address.

In addition to these tables, there is also a global table which is simply a list RALIST 62 (FIG. 4) of real addresses used in association with global segments which have been created and are in existance, as well as a table 63 (KEYLIST) which establishes a relation between each global segment key and global segment identification code or, shm-id. The shared memory identifier shm-id points directly point to the structure SHM-DS.

The operation of the system by means of these data structures is described in the following.

When a new process is created by a system call and a new data structure is created, describing the process, the table PROC.T.E. is updated first. If the new process requires the use of a shared segment, a system primitive, named shm-get, is activated.

Figure 10:
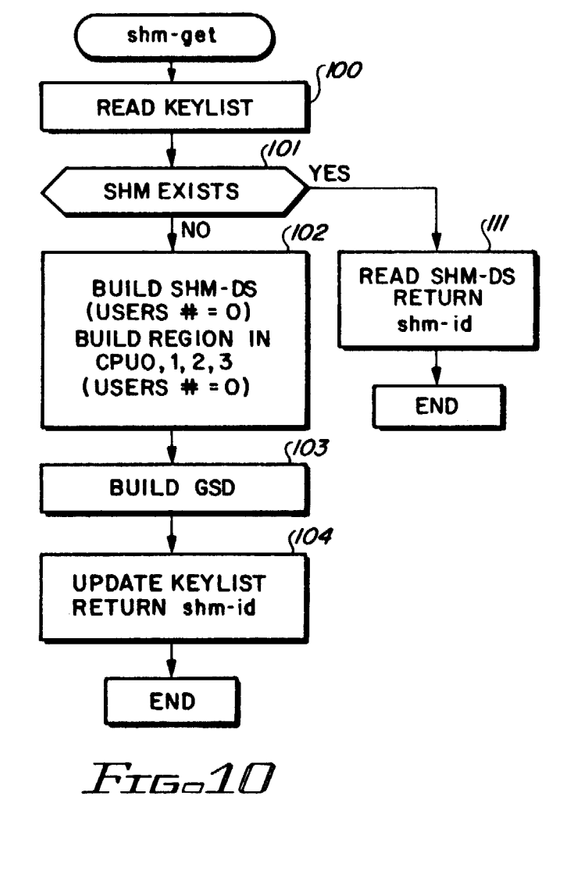
FIG. 10 shows in flow diagram the operations performed by a system primitive (shm-get) for the creation of a shared memory segment.

The flow performed by such a primitive is summarized in a sequence of blocks shown in FIG. 10. This primitive checks if a shared segment having the required features and functionalities is already existing. This check is performed by means of the KEY LIST (block 100). If the shared segment does not exist (block 101), the data structure SHM-DS (which is a global table, and is therefore replicated) is built up, to describe the new segment.

A local REGION is built up in each CPU to provide a local description of the new segment; the SHM-DS table and the REGION tables are linked each other through pointers (block 102).

In addition, a table GSD is allocated as global table (hence replicated in the local memory of each CPU). Table GDS is provided with the due heading, corresponding to the segment key or shm-id. The size of the table is defined as a function of the size of the segment to be described (block 103). In this phase, table GSD is empty, except for the heading. It is initialized or compiled at a subsequent phase.

It must be noted that no memory space is allocated, except the one needed by the REGION local tables and by the global tables SHM-DS and GSD.

The KEYLIST is updated with the new KEY/shm-id pair related to the created shared segment (block 104). Thus a new segment is nominally created.

Figure 11:
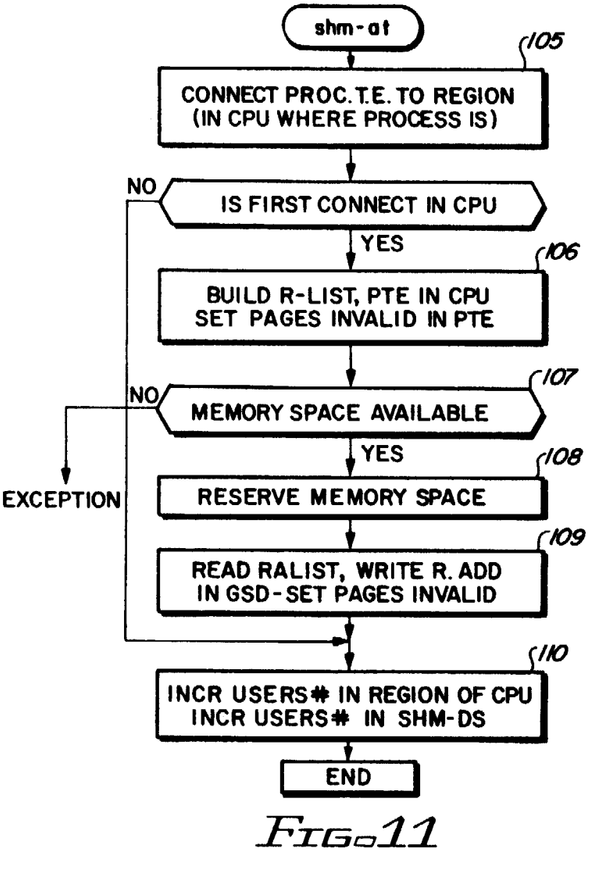
FIG. 11 shows in flow diagram the operations performed by a system primitive (shm-at) for the connection of a shared segment to a process.

The use of such segment is initiated by means of a primitive shm-at, which invokes the connection of the segment to a user process. FIG. 11 is a flow diagram of the operations performed by such primitive, which are shown as a concatenation of blocks.

By means of this primitive, the PROC.T.E entry of the requesting process is connected, through the P-REGION and in conventional way to the REGION which locally describes the shared segment (block 105). This means that if the requesting process I is executed in the CPU 0, it will be connected to REGION 50, built up in CPU 0, whilst a requesting process N, executed in the CPU 1, will be connected to REGION 51, built up in CPU 1 (FIG. 4). Both REGION tables 50, 51, are linked to the same table SHM-DS 44.

Further, the first time the primitive shm-at is performed in a CPU for connecting the segment, the table R-LIST and the table PTE are built up in the local memory of the CPU where the connection is performed (block 106).

A test is performed in the CPU which connects the segment and only in that CPU, to determine whether memory space is available for the physical allocation of the shared segment (block 107). Once verified that the memory space is available. as free space of the working memory and/or as a memory space already containing information which can be swapped, thus freeing the space, this space is booked in terms of required number of pages, but not allocated (block 108).

The segment GSD is compiled with a series of real addresses chosen from among those which have not been used, on the basis of the list RALIST, which is updated (block 109).

The allocation of physical memory space is made only on demand, owing to the "page fault" mechanism.

Initially, the tables R-LIST and PTE linked to the REGION tables are loaded with information defining the physical pages as invalid or missing (no physical page address is given, block 106).

Subsequently, as the physical pages are allocated on demand to store information identified by virtual page addresses and related real addresses, the relation between real page address and physical addresses is established.

The physical addresses so assigned are then written in the translation memory 8B, for locally converting the real addresses into physical addresses.

In table GSD the pages are all set missing (bit S0, S1, S2. S3 invalid) and the status bit GS is meaningless (block 109).

In the REGION table related to the CPU where the first connection of the shared segment is performed, the field reserved to indicate the number of current users of the shared segment, initially empty, is incremented by one. The same occurs for a field in the SHM-DS structure, which has the same function at system level (block 110).

As was described, the shm-at primitive connects a shared segment to a process, but does not allocate a physical memory space to the process. Allocation is made on demand, by the page fault mechanism, suitably modified.

Before considering this aspect, it is advisable to consider the case of shared segment generation when the segment already exists, and its connection to another process.

A) If a generic process requests, with the shm-get primitive, the creation of a shared segment and this segment already exists and is defined by the same KEY and the same SHM-ID, the primitive does nothing more than supply the process with information enabling it to perform the connection, that is to execute the sham-at primitive (FIG. 11 block 111).

B) If a generic process requests, with the shm-at primitive, the connection of an already existing segment, the segment being already connected to another process in the same CPU, the system selects, in the structure SHM-DS, the address of the region REGION in the same CPU where the requesting process is operating and connects the P-REGION of the requesting process to this REGION (block 105, FIG. 11).

The REGION field which defines the number of segment current users is incremented by one, as well as the corresponding field of the SHM-DS structure (block 110).

This implies that processes operating on the same shared segment can use differing virtual addresses for reference to the shared segment, because the base of the virtual addresses is stored in the P-REGION, there being a P-REGION per process, whilst several differing P-REGIONs point to the same REGION.

It will next be considered how the page fault mechanism, the Main Memory Management System, MMMS, operates to allocate physical pages in case of shared pages. The operations performed by the page fault handling mechanism are shown in the flow diagram of FIGS. 12, 13.

Figure 12:
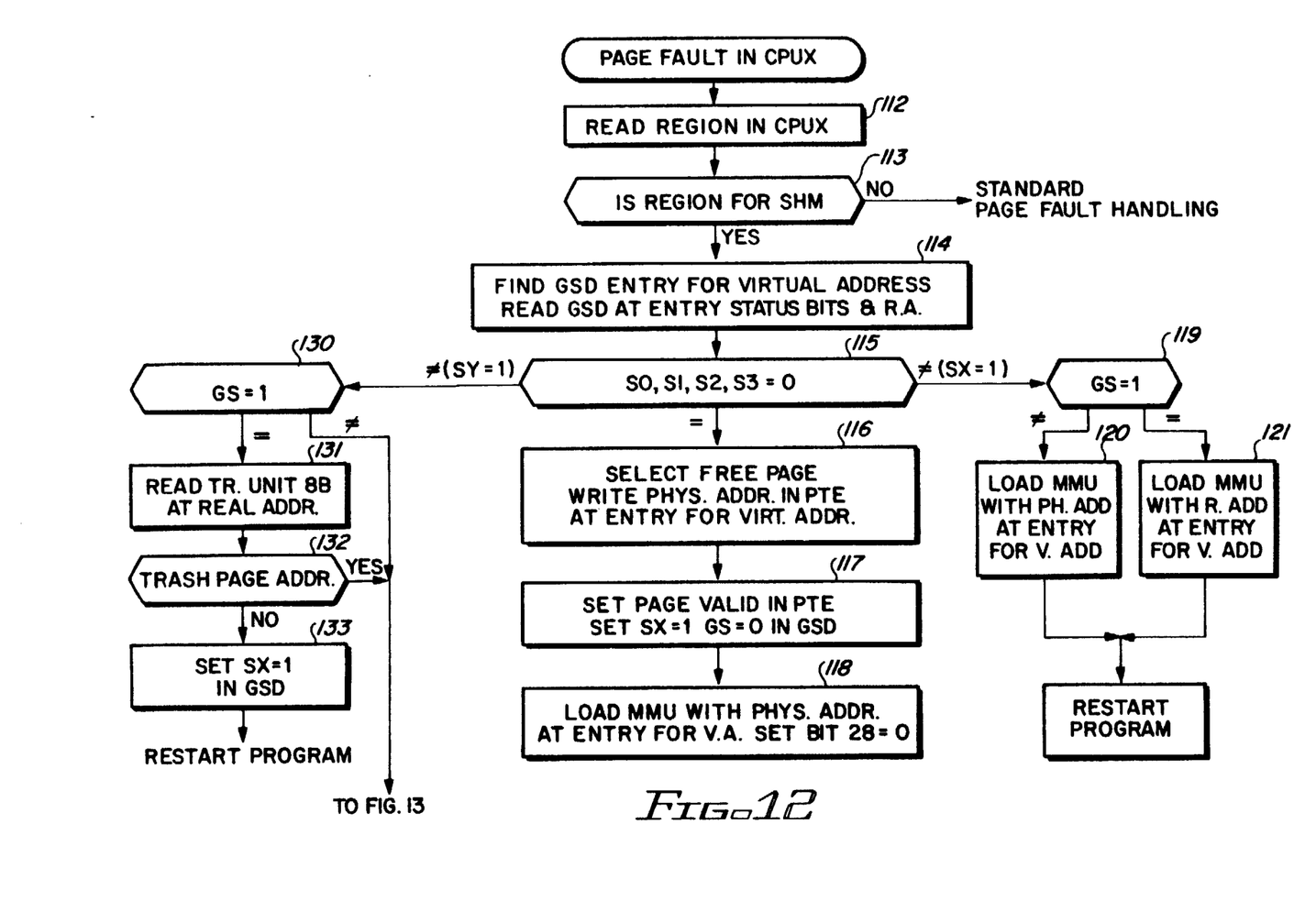
FIGS. 12 and 13 flow diagrams of the operation of a memory management system for the handling of page faults caused by access to shareable data.

The first time a program active in a CPU (for instance CPU 0) seeks to have access (by a virtual address) to a shared segment page (which is preceded by execution of the primitives shm-get and shm-at, the first generating the table REGION in the local memory of each CPU, the second generating the tables R-LIST, PTE in the local memory of CPU 0), the related MMU generates a page error signal. This in turn activates the memory management system MMMS.

By means of the already described tables, in particular the GSD table, it can be detected that the page is for a shared segment and that it does not exist in any one of the local memories (bits S0, S1, S2, S3 invalid in GSD table, blocks 112, 113, 114, 115).

The MMMS system then selects a free memory page and loads the related physical address in the PTE table (block 116).

It further validates the page status, both in the PTE table and in the GSD table (by setting to 1 the related status bit S0, block 117).

Eventually, the contents of MMU are updated with the related virtual address/physical address (block 118). In this case, since the page is valid in one CPU only (CPU 0), it is treated as local information and the related physical address is written in the MMU. Bit 28, which characterizes the information as global or local is set to 0.

Any subsequent access operation to the same page by the same program occurs without activation of the page fault mechanism.

If another program, active in the same CPU, attempts to have access to the same page (in compliance with access limitations, for instance, read only) the access occurs normally without activation of the page fault mechanism, unless a differing virtual address (synonym) is used for the same information. In this case, the page fault mechanism is again activated and once it has been ascertained that the page already exists in the same CPU (block 115), after having checked that the page is not yet global (block 119) and is referenced by the physical address stored in the PTE table, the MMU entries are updated to provide the new relation virtual address synonym/physical address (block 120).

Should it be detected that the page has already become global, the MMU would be loaded with the real address instead of the physical address (block 121).

Now, if a program active in a CPU other than the previously considered one (CPU 0) seeks to access the same page of shared segment, the MMU related to the other CPU generates a page error signal. Thereafter in this CPU, hereinafter referred to as requesting CPU, the MMMS system is activated and, through the already described tables, it may ascertain (block 115) that the page is already present in the local memory of another CPU (CPU 0 which for the following is referenced as the owning CPU).

The requesting CPU then requests that the page be converted from local to global, hence to be replicated in all local memories, in some instances using the trash page. To this purpose, the requesting CPU, by means of its MMMS, selects a real address, among those already booked and written in table GSD, and assigns it to the requested logical page. Then it finds a free physical page within the local memory and loads the corresponding physical address in the translation memory 8B coupled to its own local memory, at the translation memory entry defined by the assigned real address. The physical address is also written in the PTE table.

The status of this page is set invalid, in the tables which reference it (PTE, GSD) to prevent its use (block 122).

Once these operations are performed, the requesting CPU sends a message to the owning CPU and requests that the requested page be moved to the global space (block 123). This page is referenced through the location of its description in the GSD table. Then the owning CPU performs the following operations:

finds the referenced page through the table GSD,
checks that it effectively owns the page and through the REGION finds the virtual address of the page.
updates the MMU tables by changing the physical address with the corresponding real address, in which bit 28 is set to 1 to characterize the page as global (block 124).
loads the physical address (obtained from its own PTE table) in its own translation unit 8B, at the entry referenced by the real address of the page (block 125).

performs a sequence of read and write operations so as to locally copy the full page (block 126).

By the write operations, (global data write) a replication is requested in the local memory of the other CPUs.

It must be noted that all CPUs other than the requesting one and the owning one, perform this operation in the trash page, because in their translation memory 8B the contents corresponding to the entry defined by the real page address have not been modified and are still those loaded at initialization, for example, the trash page address.

updates the GSD table by setting to one the bit GS related to the page (block 127).

Once these operation are performed, the owning CPU sends a message to the requesting CPU to notify that the page has been replicated (block 128).

Figure 13:
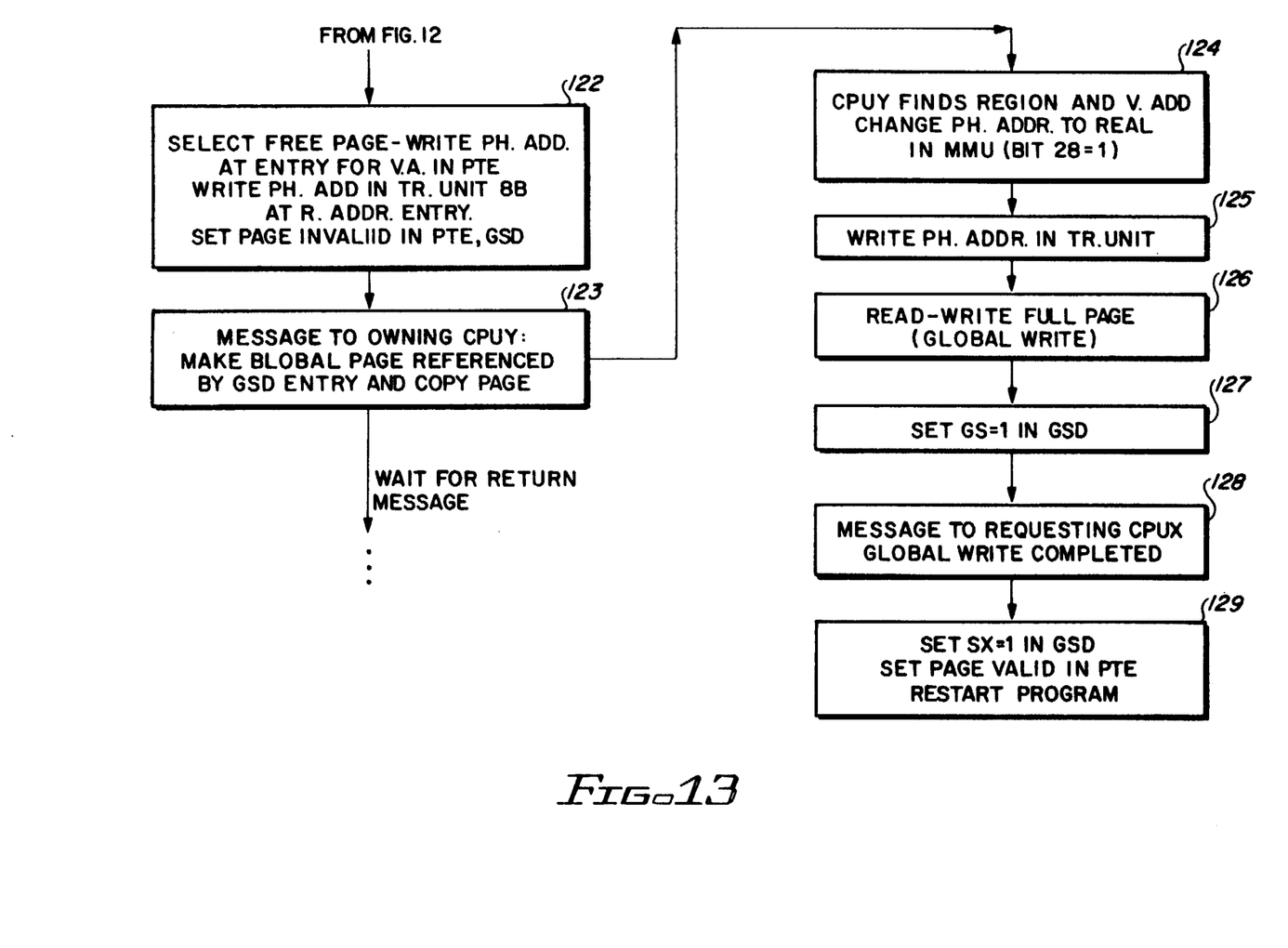

The requesting CPU, once this message is received, updates the status bit related to its own local memory in the GSD table, validates the page in its own PTE table, updates the contents of its own MMU with the real address of the page and restarts the program that requested the page (block 129).

The CPUs others than the owning and requesting CPUs, do not update the related status bit in the GSD table and leave invalid the page which is replicated in their local memory. In fact, for these CPUs, the page has been loaded in the trash page and may be cancelled at any moment by overlaying it with another page which is written in the trash page.

Once the page is made global, any data modification within the global page performed by the owning CPU or the requesting CPU is performed and replicated in all local memories, including the trash page, where necessary.

If a third CPU, requires access to the same shared page for a generic process, obviously after connection of the shared segment by the shm-at primitive, the page fault mechanism detects, through the GSD table, that the page is global but locally invalid (block 130). It performs, for the reasons which will be considered later, a further test on the PTE table, and/or by reading the translation memory 8B, and detects if the page physical address corresponding to the real address is the trash page address or another address (blocks 131, 132)

If the physical address is other than the trash page, this means that the page is already present in the local memory. It therefore simply validates the page by setting to 1 the status bit related to the page and the new CPU, in the GSD table (block 133).

If the physical page address is the trash page address, it selects a free physical page, loads the physical address of such page in the translation memory 8B, at the entry defined by the real address of the page to be loaded and requests the CPU which currently has the right to write in the global page, that the page be read as rewritten (blocks 122, 123). In this way the page is locally rewritten in the two CPUs which already have it and, at the same time, is replicated in the local memory of the third CPU. It may be noted that a shared or global segment, in the course of its use by a plurality of processors, consists of a plurality of physical pages some of which are global, hence replicated in the local memory of the CPUs which have requested them, and others of which are local and present in only one of the local memories, and not necessarily the same local pages of all the local memories.

Figure 6:
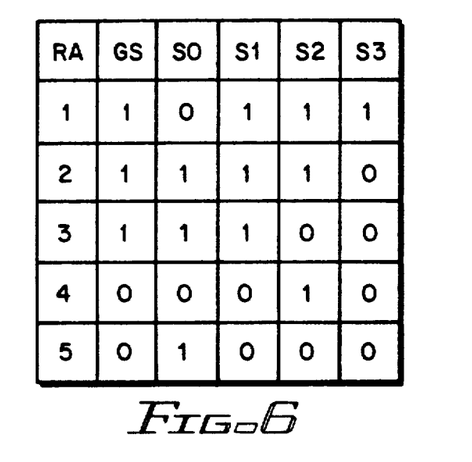
FIGS. 6, 7, 8, 9 show by way of example, the contents of the table of FIG. 5 at subsequent times.

The situation is shown by way of example in FIG. 6, which shows the status of GSD table, compiled to describe the status of a virtual segment comprising pages defined by real addresses 1, 2, 3, 4, 5.

The pages having real addresses 1, 2, 3 are global (GS=1), replicated in the local memory of CPU 0, 1, 2, 3 and used, hence valid, by one or more processes active in CPU 1, 2, 3, in CPU 0, 1, 2 and CPU 0, 1, respectively. The page with real address 1 is not used in CPU 0, hence is locally invalid. It may be physically present and can be used at any time, if not loaded in the trash page.

The presence of the page depends on the previous history of the page as it will be explained.

The same considerations are applicable to the page having real address 2, in CPU 3, and to the page having real address 3 in both CPU 2 and CPU 3.

The page having real address 4 is local and present only in the local memory of CPU 2 (GS=0, S2=1).

The page having real address 5 is local and present only in the local memory of CPU 0(GS=0, S0=1).

In this way the pages of real address 4 and 5 are treated as local, need physical memory space in one local memory only and their modification by write operation does not require system bus access operation.

Having shown how a page of a shared segment may be converted from local page to global page, dynamically, that is at "run time", and selectively replicated in the local memory of the CPUs which have requested it whilst, for the other CPUs, the replication is performed in a physical trash page, it will next be considered how the opposite operation, conversion from global to local, is performed.

In the operating systems, there are two commands are used to to exit from or end a process or to disconnect a segment from a process. They are the exit and detach commands. The first one is implicit: at the end of a process the operating system causes the exit from the process. The second is an explicit command, which controls the disconnection of a segment. In particular, in those operating systems where a shared segment is provided, there is a specific command shm-dt which controls the disconnection of a shared segment. When a process ends in a generical CPUN, the command shm-dt decrements by one the number of users stored in the structure SHM-DS and in the REGION table related to CPUN, and tests whether the number of users in the REGION table has become zero.

If there are still users, the GSD table is not modified. If for CPU N the number of users is zero, the GSD table is updated by setting to 0 the status bit related to CPU N for all those pages of the segment which are global (GS=1).

The pages which were local are kept valid, even if no longer used by CPU N, because they are pages of a shared segment and potentially may be requested by other processes in other CPUs.

For the global pages which are invalidated, the relation between physical addresses/real addresses in the translation memory 8B is left unchanged, as well as the status of the page in table PTE.

As a consequence, the invalidated pages continue to be present in the local memory and continue to be updated if global write operations are caused to occur by other processors.

However, CPU N may use the memory space at any time, assigning it to the allocation of other information if the need arises.

This is performed simply by changing the relation between real addresses/physical addresses in the translation memory SB and causing the real address to be converted into the trash page physical address. The previous physical address is assigned to a new segment.

These considerations explain why a CPU, before requesting replication of a page which is global, but locally tagged as invalid, must test if the page is already present and usable.

Resuming the description of the local invalidation phase of global pages, a further test is performed to determine if, due to such updating, all or some of the pages which were global remain valid. This test is done in one CPU only, referred to as the receiving CPU.

If this condition is not met, the pages continue to be treated as global.

If this condition is met for at least one page, the CPUN signals to the receiving CPU that it is the last to use one or more pages of the shared segment and that such pages have to be converted into local pages. Therefore the receiving CPU gets access, in turn, to the GSD table to change bit GS (global page indicator) from 1 to zero for all pages which remain in exclusive use by the receiving CPU. The receiving CPU further replaces the real address with the related physical address in the MMU for the pages which are converted to local pages. The physical address is obtained from the translation memory 8B coupled to the local memory related to the receiving CPU.

There is no need for the receiving CPU to signal the other CPUs that the physical pages allocated to the converted global pages may be freed, because they were already entitled to do so, by trashing the unused global pages into the trash page.

In this way some or even all of the pages of the shared segment, previously global and replicated, cease to be treated as such and return to be treated and addressed as local to one CPU, even if shared by a plurality of processes within the same CPU.

When, in the last CPU using pages of the shared segment, the last process using the shared segment ends, the segment will consist of local pages only, even if they are distributed in several CPUs. The freeing of these local pages and the disconnection of the shared segment are performed by the explicit disconnection request RMID (Remove shared memory identifier).

Figure 7:
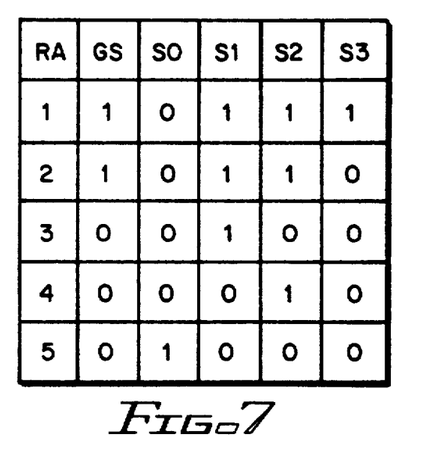
Figure 8:
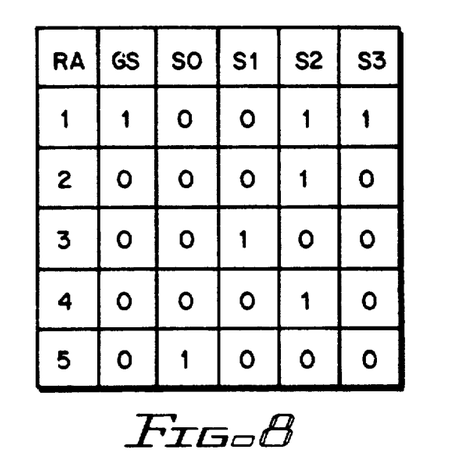
Figure 9:
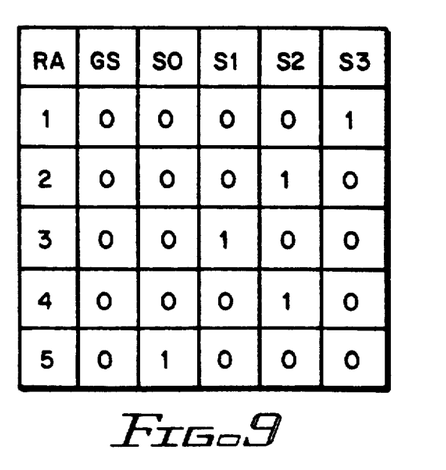

This means that all the global and local data structures which have been created to describe the shared segment (SHM-DS, REGION, R-LIST, PTE, GSD) and related pointers, are cancelled after having previously saved the contents of the segment in a swap area, if so required. FIGS. 7, 8, 9 provide an example to better show the advantages of the invention and the way in which a shared segment changes from a state of global pages to a state of local pages.

Starting from the state shown in FIG. 6, which shows the situation at a time T0, it may be assumed that at a subsequent time T1, the last process ends which uses the segment in the CPU 0. Thus, bit S0 related to the pages having real addresses 2, 3 is set to 0 (FIG. 7) and the related memory space in CPU 0 becomes free (usable for other purpose). The page having real address 5 was already local. Therefore the related bit S0 is left valid and the page remains available.

The page having real address 3 was global, but was used only in CPU 0 and CPU 1. Therefore it becomes a local page of CPU 1 (bit GS is set to 0) and the related memory space becomes, available in all CPUs, except CPU 1, for other purposes.

The page having real address 2, which was used by CPU 0, CPU 1 and CPU 2, was global and remains global. The physical memory space used by this page in CPU 0 continues to be used for allocation of the page but is potentially available, on demand and at any time, for other purposes.

At a time T2, subsequent to T1 (FIG. 8) the processes active in CPU 1 and using the segment end. Then page 2, which was global, is converted to a local page.

At a time T3 subsequent to T2 (FIG. 9) the process active in CPU 2 and using the segment have ended. Page 1, which was global, is converted to local and it is the only one still in use.

Most of the physical memory space previously used to store the concurrently used pages of the segment is available. This is before the shared segment ceases to be used, that is before a time T4 when the processes using the segment in CPU 3 end, and the segment may be disconnected and removed from memory. Most of the pages, even if used in different CPUs, are selectively replicated or treated as local, without incur the overhead resulting from handling them as global pages.

From the previous description it appears that all the operations of dynamic allocation and deallocation of global data are performed, in each of the CPUs, by the processors contained therein. The processors, suitably controlled by instruction streams, constitute a logical means which together with the described memory tables and their contents, including table GSD, control the execution of the described operations.

In this context, the trash page, combined with the translation memory 8B, is an essential element which allows for the execution of global write operations, that is, write operations controlled jointly in all local memories but actually performed selectively in any subset of the local memories.

It is further clear that the preceding description relates to a preferred embodiment of system and method in accordance with the invention and that several changes can be made.

In particular, the use of a physical memory page for the trash page, even if preferred is not necessary. It is possible to use an "abstract" page, that is a page which does not reside in the effective memory space, and substitute for the page logic which simulates its existance but avoids generation of overmemory signals when the page is addressed. Even the functions performed by the primitives in the generation and modification of the tables which describe the several processes and in the generation of the messages among the several CPUs, may be assigned in a different way, as a function of operating system constraints and function offered at the hardware level of the CPUs. For example the conversion of a page from local to global by its replication, or the replication of a page which is already global in a CPU which previously had discarded it in the trash page, may be performed by the requesting CPU, rather than the owning CPU, and by means of direct memory access (DMA) circuits.

We claim:

1. A multiprocessor system having distributed shared resources and dynamic and selective global data replication, comprising:
   a system bus, and
   a plurality of CPUs, each CPU comprising:
      a processor, a local memory, a memory management unit (MMU) coupled to said processor for converting a virtual information page address generated by said processor into an address having a bit field which characterizes the address as either real and related to a page of global data which needs to be replicated to the local memory of all said CPUs or physical and related to a page of local data, an interface unit connected to said system bus and enabling the exchange of information among said plurality of CPUs through said system bus, an address translation unit coupled to said local memory for converting a real address, received from either said MMU or said system bus, through said interface unit, into a physical address referencing an entry of said local memory, a memory table (GSD) replicated in the local memory of each of said plurality of CPUs, and storing information which, for each address in a set of virtual page addresses;

defines the related data page as a global data page or a local data page, specifies in which of said CPUs the data page is valid, and specifies the real address to be used for referencing said data page, a trash page in said local memory of each of said plurality of CPUs, each said trash page having a predetermined physical address, said trash page having a predetermined physical address, said address translation unit, in each of said CPUs, being initialized for converting a set of said real addresses into said predetermined trash page physical addresses, first logic means, said first logic means in a first CPU among said plurality of CPUs adapted to perform a page fault procedure in response to an indication of missing page generated by the said first CPU's MMU, and referencing said GSD table in said first CPU's local memory to detect if said missing page is valid in another CPU among said plurality of CPUs and stored in said another CPU's local memory and, when said missing page is found to be valid in a second CPU;

allocating a physical page of said first CPU's local memory for storing said missing page, modifying the contents of said first CPU's address translation unit to reference said allocated physical page when a predetermined real address is used to reference said missing page, and requesting said second CPU to replicate said page, valid in said second CPU, as a global data page at said predetermined real address, and second logic means, said second logic means in said second CPU being responsive to said request from said first, CPU to copy said page valid in said second CPU at said predetermined real address as a global data page, whereby said page is replicated in a physical page other than said trash page, in a set of CPUs including said first CPU, where the address translation unit contents have been modified to reference a page other than said trash page, when said predetermined real address is received by the address translation unit of each CPU in said set.

2. A multiprocessor system as in claim 1, further comprising third logic means, said third logic means in a third CPU among said plurality of CPUs, being adapted to detect, at the end of a process executed in said third CPU, when a global data page is no longer needed in said third CPU but is still valid in at least two other CPUs among said plurality of CPUs, and for modifying the information stored in said GSD table to indicate that said no longer needed global data page is invalid in said third CPU and for modifying the contents of the address translation unit in said third CPU, when memory space is needed in said third CPU, so as to reference said trash page, when the real address referencing said no longer needed global data page is received by said address translation unit in said third CPU.

3. A method for the dynamic and selective allocation of replicated global data pages in a multiprocessor system including:

a system bus, and a plurality of CPUs, each CPU comprising:

a processor, a local memory, a memory management unit (MMU) coupled to the processor for converting a virtual information page address generated by the processor into an address having a bit field which characterizes the address as either real and related to a page of global data which needs to be replicated in the local memory of all the CPUs or as physical and related to a page of local data, an interface unit connected to the system bus and enabling the exchange of information among the CPUs through the system bus, and an address translation unit coupled to the local memory for converting the real address received from either the MMU or the system bus through the interface unit into a physical address referencing entries of the local memory, which method comprises the steps of:

initializing the address translation unit in all the CPUs for converting a set of real addresses into a predetermined physical address of a trash page, generating for a data segment of data which may be shared by a plurality of processes a replicated GSD table which, for each segment page, defines if the page is global and valid in a plurality of the CPUs or local and valid in only one of the CPUs, in which of the CPUs the page is valid, and a real address to be used for referencing the page, detecting, by reading the GSD table, when a shareable data page requested by a process active in a first CPU among the CPUs and missing in the first CPU is valid in a second CPU among the CPUs, allocating a physical page of the local memory in the first CPU, for storing the missing page, modifying the contents of the address translation unit in the first CPU to reference the allocated physical page when a predetermined real address is used to reference the missing page, requesting by the first CPU that the page valid in the second CPU be replicated as a global data page, replicating the page valid in the second CPU as a global data page at the predetermined real address.

4. The method of claim 3 further comprising the steps of:

detecting, at the end of a process in a third CPU of the CPUs, when a global data page used in the process is no longer needed by the third CPU but is still used in a plurality of the CPUs, modifying the information stored in the GSD table to indicate that the no longer needed data page is invalid in the third CPU, and modifying the contents of the address translation unit in the third CPU so as to reference the trash page when the real address referencing the no longer needed data page is received by the address translation unit in the third CPU.

* * * * *